United States Patent
Feistel (10) Patent No.: US 12,196,316 B2
(45) Date of Patent: Jan. 14, 2025

(54) THROTTLE RING

(71) Applicant: BURCKHARDT COMPRESSION AG, Winterthur (CH)

(72) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 18/023,255

(22) PCT Filed: Aug. 31, 2021

(86) PCT No.: PCT/EP2021/073995
§ 371 (c)(1),
(2) Date: Feb. 24, 2023

(87) PCT Pub. No.: WO2022/043577
PCT Pub. Date: Mar. 3, 2022

(65) Prior Publication Data
US 2023/0332688 A1   Oct. 19, 2023

(30) Foreign Application Priority Data

Aug. 31, 2020 (EP) .................................... 20193746

(51) Int. Cl.
*F16J 15/26* (2006.01)
(52) U.S. Cl.
CPC ..................... *F16J 15/26* (2013.01)
(58) Field of Classification Search
CPC ......... F16J 15/181; F16J 15/26; F04B 41/02; F04B 39/0005
See application file for complete search history.

(56) References Cited

U.S. PATENT DOCUMENTS

| | | | |
|---|---|---|---|
| 6,145,843 A * | 11/2000 | Hwang | F16J 15/442 277/400 |
| 6,378,875 B1 * | 4/2002 | Feistel | F16J 15/26 277/435 |
| 8,162,325 B2 | 4/2012 | Lindner-Silwester et al. | |
| 9,273,675 B2 | 3/2016 | Fejzuli | |
| 2004/0227301 A1 | 11/2004 | Wood et al. | |
| 2009/0108535 A1 * | 4/2009 | Lindner-Silwester | F16J 15/26 277/548 |

FOREIGN PATENT DOCUMENTS

KR     101898141 B1     10/2018

OTHER PUBLICATIONS

International Search Report for PCT/EP/2021/073995, Prepared by the European Patent Office, mailing date Oct. 15, 2021, 14 pages including the English Translation.

* cited by examiner

*Primary Examiner* — Abiy Teka
(74) *Attorney, Agent, or Firm* — Brooks Kushman P.C.

(57) ABSTRACT

Throttle ring for a piston compressor, the throttle ring comprising an axially running ring axis (Ar), an axial height (h), a radially inner running surface and a radially outer circumferential surface, and an upper flank and a lower flank, wherein the upper flank faces the compression space of the piston compressor when the throttle ring is in intended use. The running surface has at least one circumferential groove in the circulating direction, which is connected to the radially outer circumferential surface by at least one radial bore.

17 Claims, 5 Drawing Sheets

THROTTLE RING

CROSS-REFERENCE TO RELATED APPLICATION

This application is the U.S. national phase of PCT Application No. PCT/EP2021/073995 filed on Aug. 31, 2021, which claims priority to EP patent application No. 20193746.3 filed on Aug. 31, 2020 the disclosures of which are incorporated in their entirety by reference herein.

The present invention relates to the technical field of piston compressors, in particular to a throttle ring, a piston rod seal arrangement with such a throttle ring, and a piston compressor with such a piston rod seal arrangement. The invention further relates to a method for compressing boil-off gas produced during the storage of liquefied natural gas.

Compressors are commonly used to compress fluids such as gases or aerosols. In a piston compressor, the rotary motion of a crankshaft generated by a drive unit is converted by connecting rods into a reciprocating motion of one or more pistons, which is used to compress drawn-in gas or aerosol in a compressor unit. Piston rod sealing systems, so-called packings, are used on the moving piston rod to seal the crank-side working chamber. The contact of the sealing elements with the oscillating piston rod means that they are subject to constant wear.

A characteristic feature of the compression process taking place in a piston compressor is the occurrence of a dynamic pressure component. The dynamic pressure component is the pressure difference occurring during one crankshaft revolution between the final compression pressure and the suction pressure of the respective compression stage. Above a critical value, this dynamic pressure component leads to flow of the sealing elements and/or high wear of the same. In particular, in the case of segmented sealing elements, the dynamic pressure component often leads to fracture failure of the associated hose springs or clamping rings, which can result in premature failure of the sealing system.

To protect the actual sealing elements from these negative effects of the dynamic pressure profile, so-called pressure breaker or throttle rings are known from the prior art, which are used at the packing inlet, i.e. on the compression chamber side, and are intended to keep the dynamic pressure profile away from the actual sealing elements. Usually, such throttle rings are designed either as frictionless sealing elements from the start or as frictionless sealing elements with low shrinking wear. However, it has been shown that the common non-contacting throttle rings do not make any appreciable contribution to sealing the dynamic pressure component.

For example, the throttle ring known from CH 439 897 has the disadvantage that pulsating pressure components are only insufficiently damped. As a result, the majority of the dynamic pressure component loads the actual sealing elements and in particular the first sealing element arranged directly towards the compression chamber. Similar to a chain reaction, the dynamic pressure component migrates further into the packing as wear progresses, causing the sealing elements arranged downstream to wear rapidly even at a low to medium load, resulting in a considerable reduction in the service life of the piston rod sealing system. The wear of the sealing elements is exacerbated by foreign bodies in the fluid to be compressed, as these can get between the sealing element and the moving piston rod, for example, and thus further increase friction. There is also a risk that parts resulting from the fracture failure of the sealing elements or their clamping elements will enter the compression chamber and damage critical components therein, such as the pressure valve, or at least impair their function.

Based on the aforementioned prior art, it was the problem of the present invention to eliminate such and other disadvantages of the prior art and, in particular, to provide a throttle ring of the type mentioned at the beginning, which provides improved sealing of the dynamic pressure, ensures better protection against any foreign bodies that may be present, and can be manufactured economically.

It was a further problem of the present invention to provide a piston rod seal arrangement for a dry-running compressor capable of supplying propulsion systems of vessels fueled with compressed natural gas, and/or of reliquefaction units, wherein the natural gas is preferably in the form of liquefied natural gas (LNG) or boil-off gas.

The problem is solved in particular by a throttle ring, a piston rod seal arrangement, a compressor, and a method having the features of the independent claims. Advantageous designs and further developments are the subject of the dependent claims.

The problem is solved in particular with a throttle ring for a piston compressor. The throttle ring according to the invention comprises an axially running ring axis, an axial height, a radially inner running surface and a radially outer circumferential surface. The running surface is the surface which limits the central recess of the throttle ring within which an oscillating piston rod is movable. The throttle ring according to the invention further has an upper flank and a lower flank, the upper flank facing the compression chamber of the piston compressor or the compression chamber side in the intended use of the throttle ring. The running surface has at least one circumferential groove in the circulating direction, which is connected to the radially outer circumferential surface by at least one radial bore or radial channel. Through the at least one radial bore, the radially inner running surface and the radially outer circumferential surface of the throttle ring are in fluid communication. The radial bore preferably has a circular cross-section, but may also have other shapes, for example a rectangular cross-section.

Such a throttle ring has the advantage that the dynamic pressure component is sealed in such a way that an approximately constant pressure is applied to the downstream sealing elements of a piston rod seal arrangement, as will be described in more detail below. The throttle ring according to the invention has the further advantage that it keeps foreign bodies present in the compression chamber or in the fluid to be compressed away from the sealing elements of a piston rod seal arrangement and thus prevents the chain reaction-like wear of the sealing elements described at the beginning. The throttle ring thereby prevents both the transfer of abrasion or even fragments from the sealing system into the compression chamber or into the fluid to be compressed, and the entry of particles present in the fluid to be compressed into the piston rod sealing system. In other words, the throttle ring according to the invention is a dirt trap in both directions.

The throttle ring according to the invention is particularly suitable for the dry-running compression of gases with low molecular weight, such as hydrogen or methane, to a high final compression pressure. In particular, by using the throttle ring of the invention in dry-running compressors, pressure increases of preferably up to 300 bar, and especially preferably up to 1000 bar, can be achieved without significantly impairing the service life of the compressors.

Dry-running compression has the advantage that the fluid to be compressed is not contaminated with lubricants. The purity of the compressed fluid is thus not negatively affected. This is particularly important for those applications in which a fluid is fed back into a storage tank, as for example in the case of boil-off gas produced during the storage or transport of liquefied natural gas (LNG), which can be reliquefied and subsequently fed to the storage tank as liquefied natural gas.

Preferably, the throttle ring is designed as an endless ring.

An endless ring, also known as an uncut ring, has no butt, but is designed without interruption in the circumferential direction.

Such an endless ring is mechanically particularly resilient and can be produced economically.

The fluid flowing into the piston rod seal arrangement during the compression phase is at a higher pressure than the suction pressure of the compression stage under consideration. If the pressure in the compression chamber falls back towards the suction pressure, the fluid stored in the piston rod seal arrangement flows back into the compression chamber.

Preferably, the throttle ring has at least one channel extending in the radial direction, and preferably four to six such circumferentially spaced channels. Particularly preferably, the upper flank of the throttle ring has at least one channel extending in the radial direction. Preferably, the radial channels have a rectangular cross-section.

Such radially extending channels are also referred to as pressure equalization grooves or return flow grooves.

By providing such radially extending channels, the backflow of fluid flowing into the piston rod seal arrangement can be considerably improved, i.e. the throttle ring has virtually no sealing effect in this phase and is therefore not subject to wear. In addition, the use of return flow grooves in the packing and in particular on the throttle ring according to the invention results in a much more stable pressure distribution, since the dynamic pressure component can be dissipated back into the compression chamber via the radial channels during the suction stroke. Without the use of return flow grooves, the dynamic pressure component can migrate toward the packing outlet and cause unstable loading of the individual packing elements. This unstable pressure distribution leads to rotational and translational movements of the sealing elements and subsequently to damage to the sealing elements as well as the chambers.

Preferably, the radial holes have a diameter between 0.5 mm and 3 mm μm, preferably 0.75 mm to 1.25 mm, and more preferably 1 mm. Here, the bores can all have the same diameter or also different diameters.

The specified diameter range allows optimum pressure relief or damping of the dynamic pressure component, and at the same time prevents abrasion and/or fragments from the packing from passing through the radial bores. The preferred diameter range thus provides the greatest possible protection of the compression chamber against foreign bodies from the packing.

Preferably, the radial bores running from the respective circumferential groove to the circumferential surface are arranged axially symmetrically to each other with respect to the ring axis.

Such an arrangement of radial bores results in uniform pressure relief and particularly high stability of the throttle ring.

Preferably, the circumferential grooves run essentially parallel to the upper and lower flanks of the throttle ring.

Such grooves running parallel to the upper and lower flanks of the throttle ring can be produced particularly easily, for example by mortising.

According to the invention, it is preferred that the running surface of the throttle ring comprises several circumferential grooves. Such a running surface with several circumferential grooves can be regarded as a labyrinth seal, the functional principle of which is that the fluid to be compressed repeatedly dissipates pressure energy into heat when flowing through several constrictions (throttling points) connected in series and is thus throttled. In the present throttle ring, the constrictions are the webs arranged between two adjacent circumferential grooves. Due to the pressure gradient, the fluid to be compressed is first accelerated towards the throttling point, resulting in a conversion of pressure energy into velocity energy. In the subsequent circulating groove, the outgoing volume flow dissolves into small, disordered vortices, under conversion into frictional heat. This process is repeated according to the number of circulating grooves until the end of the throttle ring.

Preferably, the circumferential grooves are arranged in a range from 10% to 90% relative to the axial height of the throttle ring. Particularly preferably, the circumferential grooves are arranged in a range from 25% to 75% relative to the axial height of the throttle ring.

Preferably, the radial bore has a diameter in the range of 50% to 150% of the width of the circumferential groove in the axial direction.

The arrangement of the circumferential grooves in the indicated, preferred region of the running surface has the advantage that the throttle ring thus obtained is mechanically particularly stable. In particular, the ring edges formed between the axially outermost grooves and the respective flanks are thus sufficiently stable mechanically. This reduces the risk of the throttle ring itself becoming a source of fragments.

Unless otherwise indicated, the term "axial height" in the con-text of the present description refers to the axial height of the radially inner running surface. In the event that the two flanks of the throttle ring are spaced parallel to each other, the axial height of the radially outer circumferential surface consequently corresponds to the axial height of the radially inner running surface.

Preferably, the circumferential grooves each have a groove depth between 0.5 mm and 3 mm. In addition or alternatively, the circumferential grooves preferably have a groove width between 0.5 mm and 3 mm.

These preferred dimensions of the circumferential grooves enable abrasion and/or fragments from the packing to be retained particularly effectively in the circumferential grooves.

It is also conceivable according to the invention that the grooves running around in the circulating direction have different groove widths.

The presence of circumferential grooves of different widths has the advantage that this makes it possible to retain abrasion of different sizes and/or fragments of different sizes inside the grooves particularly well.

Preferably, the groove width decreases in the direction of the upper flank. The narrowing of the respective circumferential grooves in the direction of the upper flank of the throttle ring, i.e. in the direction of the compression chamber, allows abrasion and/or fragments from the packing to migrate between the circumferential grooves until they are finally trapped in a circumferential groove of a suitable size. This allows the protective function of the throttle ring to be increased.

Alternatively, according to the invention, it is also conceivable that the groove width increases from both flanks in the direction of half the axial height. This has the advantage that abrasion and/or fragments from both sides, i.e. the compression chamber side and the drive side, are optimally retained inside the throttle ring.

Modified high-temperature polymers whose properties meet the requirements imposed on such throttle rings, especially with regard to mechanical stability and wear resistance, can be used to manufacture the throttle rings according to the invention.

Preferably, the throttle ring is made of plastic. For example, polytetrafluoroethylene (PTFE), polyether ether ketone (PEEK), polyether ketone (PEK), polyimide (PI), polyphenylene sulfide (PPS), polybenzimidazole (PBI), polyamide imide (PAI), polyamide (PA), polyexy methylene (POM), or modified epoxy resin can be used to manufacture the throttle rings according to the invention.

Particularly preferably, the throttle ring is made of polytetrafluoroethylene (PTFE).

The plastics used may be modified with fillers. Such polymers modified with fillers are also called filled polymers.

The added fillers are usually carbon, graphite, metals, ceramics, glass beads, solid lubricants and/or fibrous materials such as carbon fibers, aramid fibers, glass fibers.

Such fillers can, for example, improve the tribological properties of the plastic used, increase its temperature resistance and reduce cold flow.

Particularly preferably, the throttle ring is made of a plastic modified with solid lubricants.

The entire throttle ring can be made of one single material. Such a throttle ring has the advantage that it can be manufactured particularly efficiently, for example by an injection molding process.

According to the invention, it is also conceivable that the running surface of the throttle ring is provided with a wear protection layer at least in the area of the surface that can be brought into contact with a piston rod of the piston compressor.

For example, the wear protection layer may be a diamond-like carbon (DLC) layer.

It is also conceivable that the throttle ring is made of a metal and the running surface is made of a material capable of dry-running, such as plastic or ceramic.

The problem is further solved by a piston rod sealing arrangement for sealing a longitudinally movable, oscillating piston rod of a piston compressor. A piston rod sealing arrangement according to the invention comprises at least one throttle ring as described herein and at least one sealing element arranged downstream of the throttle ring.

The term "sealing element" refers to all such elements that seal the passage of a piston rod into the interior of a cylinder, i.e. in particular sealing and/or throttle rings.

Such a piston rod seal arrangement exhibits a high damping capacity of the dynamic pressure profile as well as a long service life.

In particular, the piston rod seal arrangement can be used in a dry-running piston compressor. This has the advantage that the fluid to be compressed is not contaminated by lubricants.

Preferably, the piston rod seal arrangement has at least one channel for the supply and removal of coolant.

Since a large part of the wear occurring on the sealing elements can be attributed to frictional heat, the wear can be reduced by cooling the sealing elements in the packing.

The problem is further solved with a dry-running piston compressor having a piston rod seal arrangement as described herein.

Compressors are usually subjected to long continuous operation or frequent switching on and off, which leads to high heat generation due to friction. In the past, therefore, compressors were primarily used that ensured a sufficient cooling effect due to oil lubrication. With oil lubrication, however, there is a risk that the lubricating oil in the housing of the compressor unit will penetrate the fluid to be compressed via the piston/cylinder pairing, which can ultimately lead to contamination of the compressed fluid. This danger does not exist with the dry-running piston compressor described herein.

The problem is further solved by a process for compressing boil-off gas which is produced during the storage of liquefied natural gas (LNG). The process according to the invention comprises the provision of at least one dry-running piston compressor according to the invention, the single-stage or multi-stage compression of the boil-off gas to be compressed, and the at least partial supply of a multi-fuel engine with the compressed boil-off gas as fuel, wherein the pressure increase achieved by the single-stage or multi-stage compression is at least 200 bar, preferably at least 250 bar. Alternatively or in addition to supplying a multi-fuel engine with the compressed boil-off gas as fuel, the process according to the invention may comprise the reliquefaction of boil-off gas.

The use of a throttle ring in a compressor as described herein in the process according to the invention has the advantage that the compressor can be operated without the use of lubricants even at a pressure increase of 300 bar, due to the throttle ring according to the invention, and at the same time very long service lives in the order of 4000 operating hours are achieved. On the one hand, the boil-off gas to be compressed can be compressed to such an extent that a multi-fuel engine designed for operation with gas can be operated with it. Secondly, the boil-off gas is not contaminated by lubricants during reliquefaction.

The process according to the invention is preferably suitable on a ship operable with liquefied natural gas, which ship comprises a dual-fuel ship engine.

Various embodiments of the invention are described below with reference to drawings, wherein the same or corresponding elements are designated with the same reference signs.

It shows.

Figure 1:
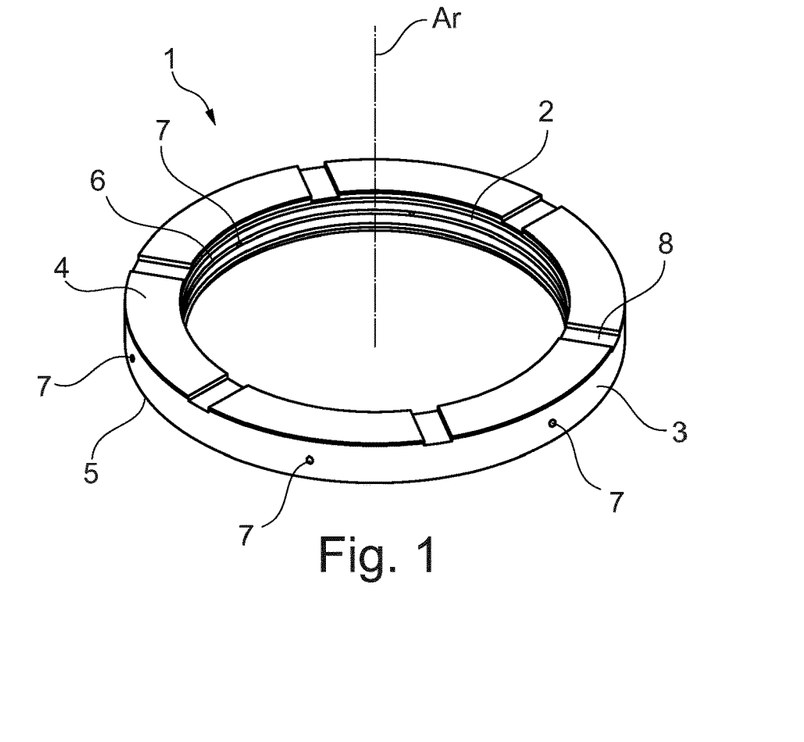
FIG. 1 a throttle ring according to the invention.

FIG. 1 shows a perspective view of a throttle ring 1 for a piston compressor. The throttle ring 1 has a ring axis Ar running in the axial direction and has a recess with a radially inner running surface 2 in the axial direction, along which a piston rod 14 (shown approximately in FIG. 3b) can be moved. The diameter of the axial recess is dimensioned in such a way that the throttle ring 1 can completely enclose the piston rod while not or barely touching the surface of the moving piston rod. For example, the axial play of the throttle ring 1 is between 0.1 and 0.25 mm. This ensures that no or only a small amount of frictional heat is generated when the throttle ring 1 is used as intended. In the example shown, the running surface 2 has three mutually spaced grooves 6 in the direction of the ring axis Ar, which run in the circulating direction and are of endless de-sign. In the example shown, the middle of the three grooves 6 is connected to the radially outer circumferential surface 3 by six radial bores 7, as shown in even greater detail in the cross-section shown in FIG. 2c. The throttle ring 1 further has an upper flank 4 and a lower flank 5 arranged opposite thereto. In the example shown, the upper flank 4 has six channels 8 extending in the radial direction and having a rectangular cross-section. Of course, it is also conceivable that the radial channels 8 have a different cross-sectional shape.

Figure 2A:
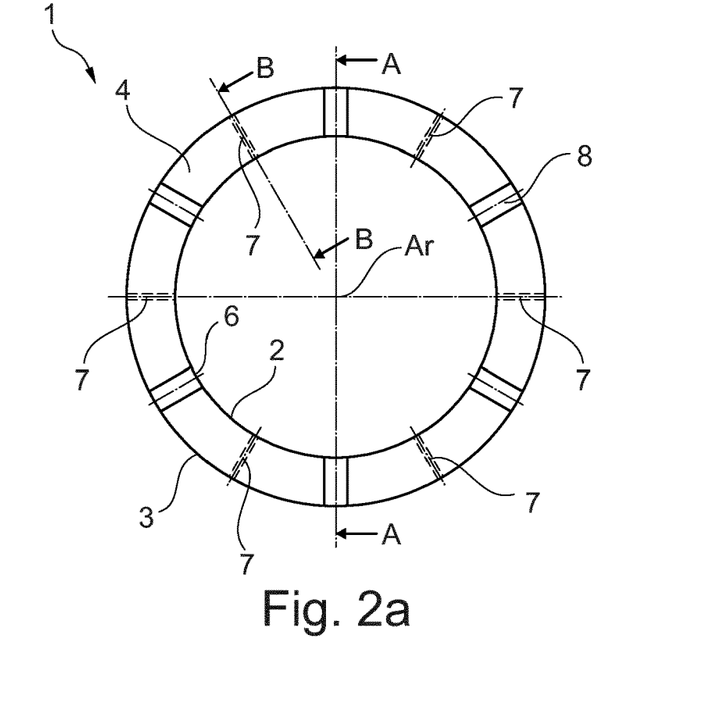
FIG. 2a a top view of a first embodiment of a throttle ring.

FIG. 2a shows the throttle ring 1 of FIG. 1 in a top view onto the upper flank 4. The radially inner running surface 2 and the radially outer circumferential surface 3 run concentrically to each other. In the present embodiment, the radial bores 7 and also the radial channels 8 are arranged axially symmetrically to one another with respect to the ring axis Ar, and are mutually evenly spaced in the circumferential direction. In the circumferential direction, for example, one, two, four, six or eight radial bores 7 could be arranged mutually spaced, preferably mutually equally spaced.

Figure 2B:
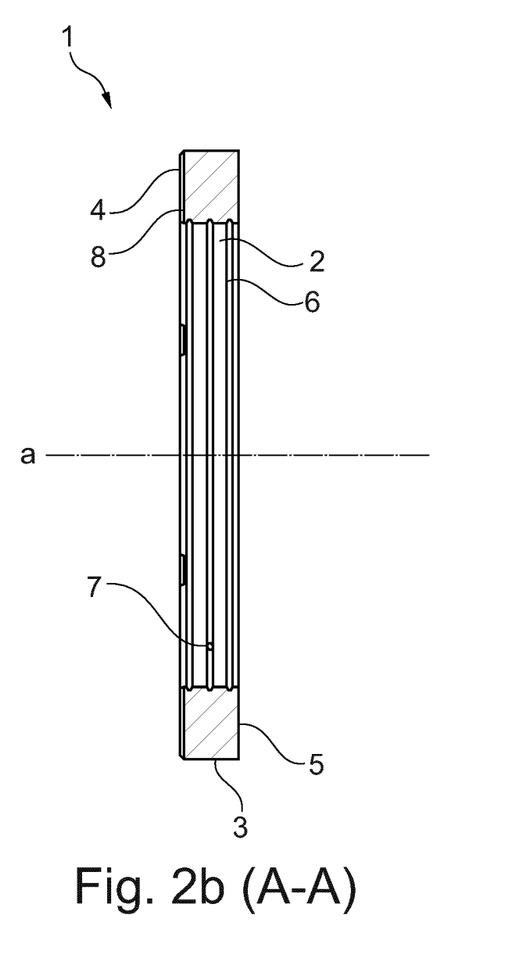
FIG. 2b a cut through FIG. 2a along line A-A.

FIG. 2b shows a radial cut through the embodiment shown in FIG. 2a along line A-A. The annular body of the throttle ring 1 can be rectangular in shape, as in the present embodiment. The three circumferential grooves 6 extend substantially parallel to the two flanks 4 and 5 of the throttle ring 1. In the present embodiment, the three circumferential grooves 6 have substantially equal groove widths and groove depths. Of course, it would also be possible for the circumferential grooves 6 to have different groove widths and/or groove depths from one another. It would also be possible, for example, for two or all of the circumferential grooves 6 to have one or more radial bores 7 via which the respective grooves 6 are in fluid connection with the radially outer circumferential surface 3.

Figure 2C:
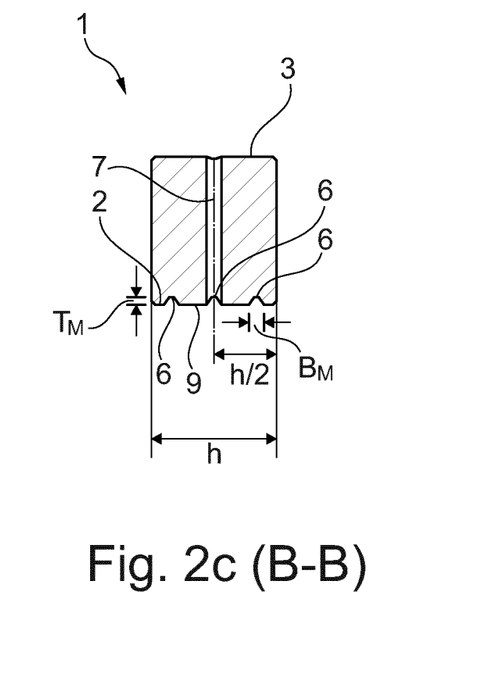
FIG. 2c a cut through FIG. 2a along line B-B.

FIG. 2c shows a cut along the line B-B according to FIG. 2a. The annular body of the throttle ring 1 has a height h in the axial direction Ar. A radial bore 7 is shown, which opens from the radially outer circumferential surface 3 into the middle of the three circumferential grooves 6 and connects the radially inner running surface 2 with the radially outer circumferential surface 3. The middle of the three circumferential grooves 6 is arranged at half the axial height h/2 of the throttle ring 1. The webs 9 arranged in each case between two circumferential grooves represent throttling points in conjunction with a piston rod running back and forth in the axial recess of the throttle ring 1 (shown in FIG. 3b).

Figure 3A:
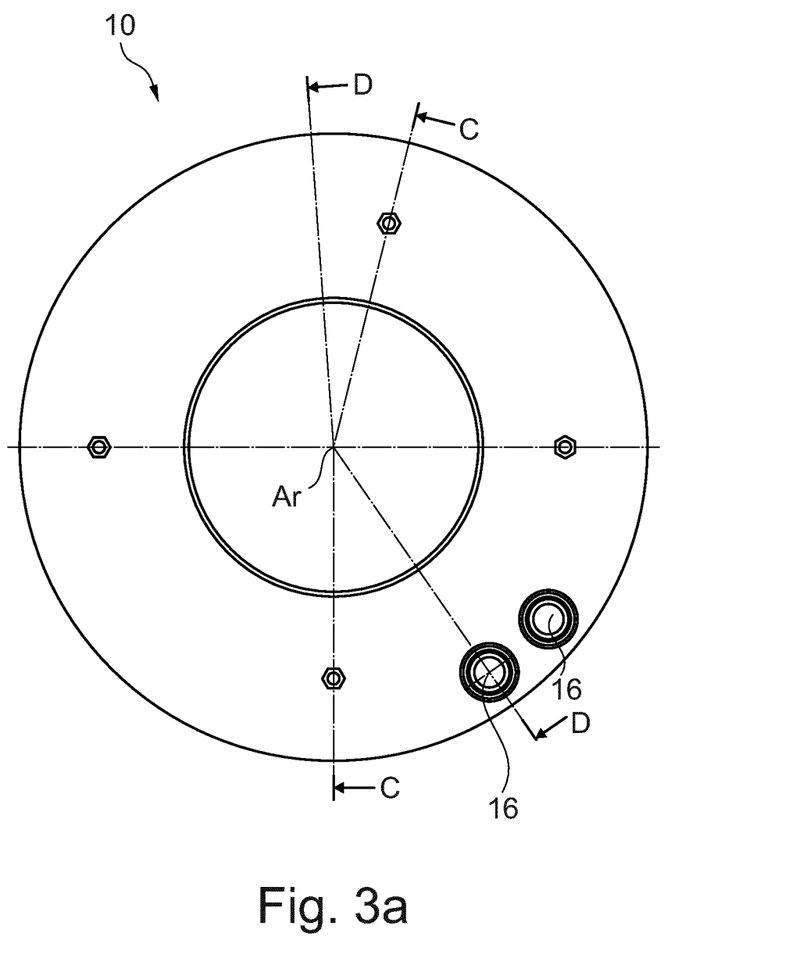
FIG. 3a a top view of a packing cartridge.

FIG. 3a shows a top view of a piston rod seal arrangement 10 with two cooling channels 16, a supply channel and a discharge channel for the coolant. In the present embodiment, the piston rod seal arrangement 10 comprises two sealing elements 13 and a throttle ring 1, as will be explained in more detail in the following drawings.

Figure 3B:
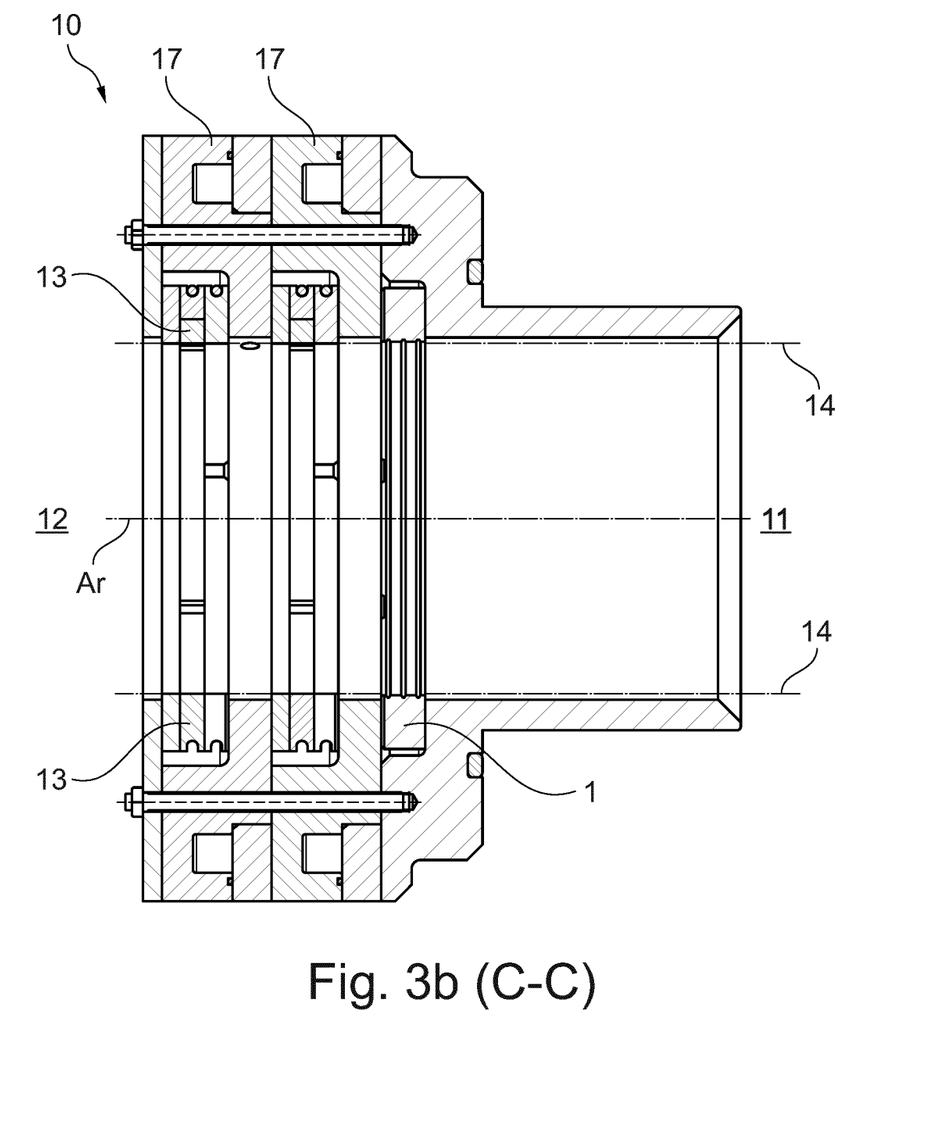
FIG. 3b a cut through FIG. 3a along line C-C.

FIG. 3b shows an axial cut through the piston rod sealing arrangement 10 according to the line C-C in FIG. 3a, wherein in the installed state the piston rod drive is located on side 12 and the compression chamber is located on side 11. The packing is designed as a dry-running sealing arrangement and in the present embodiment comprises two chamber rings 17 arranged one after another in the direction of the piston rod 14 with sealing elements 13 arranged therein. The throttle ring 1 is arranged on the compression chamber side adjacent to the sealing elements 13.

Figure 3C:
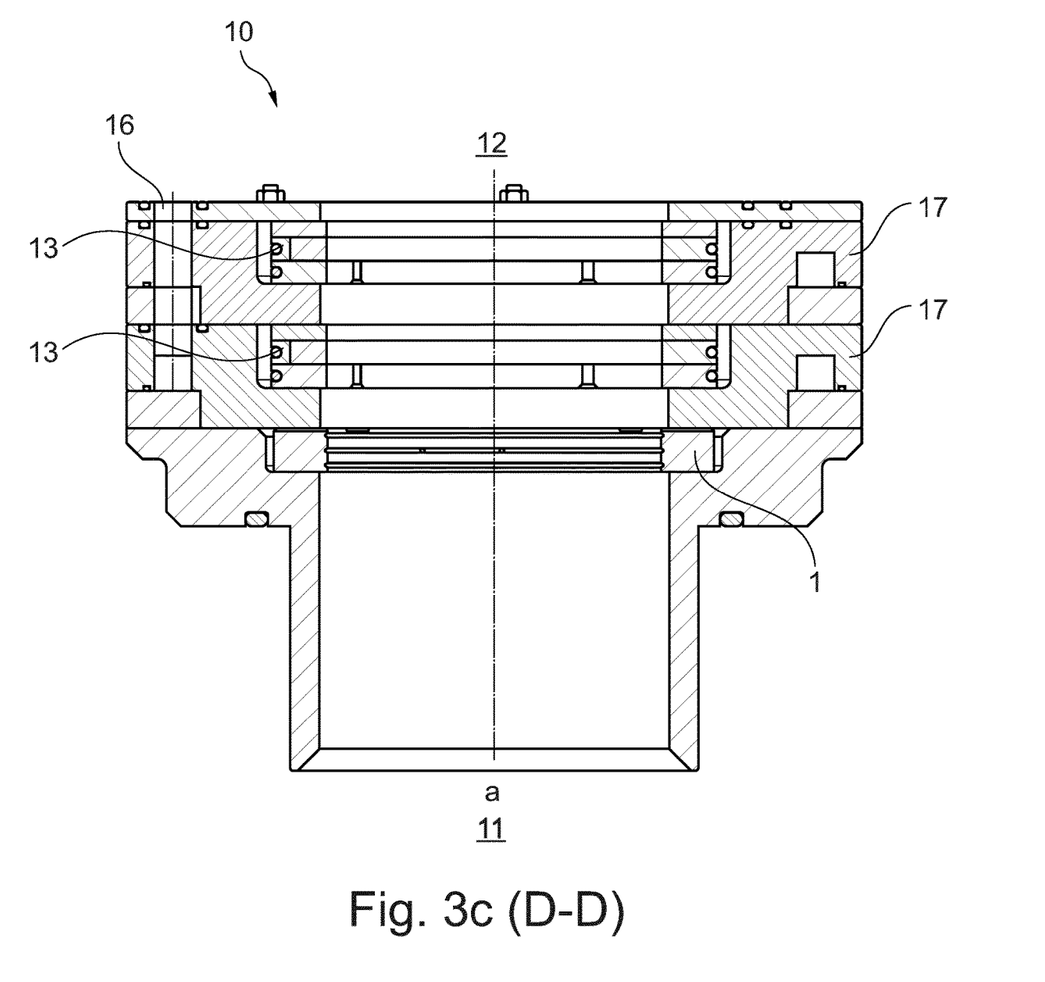
FIG. 3c a cut through FIG. 3a along line D-D.

FIG. 3c shows an axial cut through the piston rod seal arrangement 10 according to the line D-D in FIG. 3a, which passes through the lubrication channel 15 as well as one of the cooling channels 16.

In an advantageous embodiment, the throttle ring 1 described above is configured such that each of the circumferential grooves 6 on the radially inner running surface 2 is connected to the radially outer circumferential surface 3 by at least one radial bore 7, and preferably two, four, six or eight bores 7. In an advantageous embodiment, the throttle ring described above is designed in such a way that the radially inner running surface 2 of the throttle ring is made of a material with greater hardness than that of the flanks.

In an advantageous embodiment, the throttle ring described above is designed in such a way that the circumferential grooves 6 are spaced apart from one another in the direction of the ring axis Ar by a distance of 0.5 mm to 5 mm, preferably 1 mm to 3 mm.

The invention claimed is:

1. A throttle ring for a piston compressor, said throttle ring having an axially running ring axis, an axial height, a radially inner running surface and a radially outer circumferential surface, and an upper flank and a lower flank, the upper flank facing a compression space of the piston compressor when the throttle ring is used as intended, the running surface having grooves which run around in a circulating direction and are connected to the radially outer circumferential surface by at least one radial bore, and wherein the grooves are arranged in a range of 10% to 90% relative to the axial height of the throttle ring.

2. The throttle ring according to claim 1, wherein the throttle ring is formed as an endless ring.

3. The throttle ring according to claim 1, wherein the throttle ring has at least one channel extending in a radial direction.

4. The throttle ring according to claim 1, wherein the radial bores have a diameter in the range between 0.5 mm and 3 mm.

5. The throttle ring according to claim 1, wherein the radial bores extending from the respective groove to the circumferential surface are arranged axially symmetrically to one another with respect to the ring axis.

6. The throttle ring according to claim 1, wherein the grooves extend parallel to the upper flank and lower flank of the throttle ring.

7. The throttle ring according to claim 1, wherein the grooves each have a groove depth between 0.5 mm and 3 mm or a groove width between 0.5 mm and 3 mm, or a combination thereof.

8. The throttle ring according to claim 1, wherein the grooves have different groove widths.

9. The throttle ring according to claim 8, wherein the groove width decreases in the direction of the upper flank or increases from both flanks in the direction of half the axial height.

10. The throttle ring according to claim 1, wherein the throttle ring consists of plastic.

11. The throttle ring according to claim 1, wherein the running surface is provided with a wear protection layer at least in a region of the surface which can be brought into contact with a piston rod of the piston compressor.

12. A piston rod seal arrangement for sealing a longitudinally movably mounted oscillating piston rod of a piston compressor, the piston rod seal arrangement comprising at least one throttle ring according to claim 1 and at least one sealing element mounted downstream of the throttle ring.

13. A dry-running piston compressor comprising a piston rod seal assembly according to claim 12.

14. A method of compressing boil-off gas produced during the storage of liquefied natural gas, the method comprising the steps of:

providing at least one dry-running piston compressor according to claim 13;

single- or multi-stage compression of the boil-off gas;
at least partially supplying a multi-fuel engine with the compressed boil-off gas as fuel, or at least partially reliquefying the boil-off gas, or a combination of both processes;
wherein the pressure increase achieved by the single-stage or multi-stage compression is at least 200 bar.

15. A throttle ring for a piston compressor, said throttle ring having an axially running ring axis, an axial height, a radially inner running surface and a radially outer circumferential surface, and an upper flank and a lower flank, the upper flank facing a compression space of the piston compressor when the throttle ring is used as intended, the running surface having grooves which run around in a circulating direction and are connected to the radially outer circumferential surface by radial bores, wherein the radial bores extending from the respective groove to the circumferential surface are arranged axially symmetrically to one another with respect to the ring axis.

16. A throttle ring for a piston compressor, said throttle ring having an axially running ring axis, an axial height, a radially inner running surface and a radially outer circumferential surface, and an upper flank and a lower flank, the upper flank facing a compression space of the piston compressor when the throttle ring is used as intended, the running surface having grooves which run around in a circulating direction and are connected to the radially outer circumferential surface by radial bores, wherein the grooves have different groove widths.

17. The throttle ring according to claim 16, wherein the groove width decreases in the direction of the upper flank or increases from both flanks in the direction of half the axial height.

* * * * *